W. B. MESSINK.
FIFTH WHEEL.
APPLICATION FILED APR. 24, 1909.
986,482.
Patented Mar. 14, 1911.
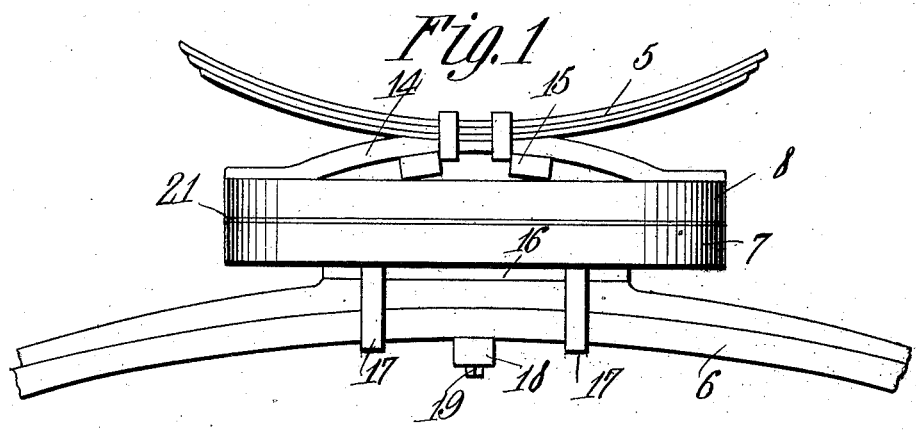
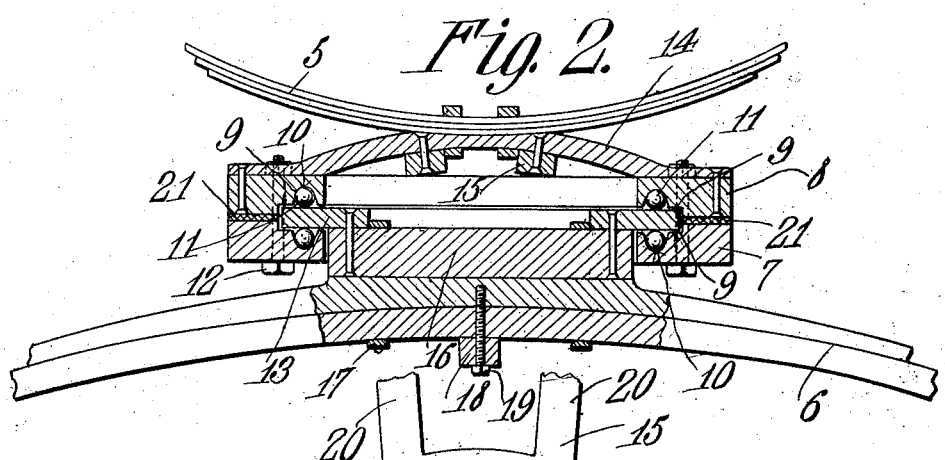
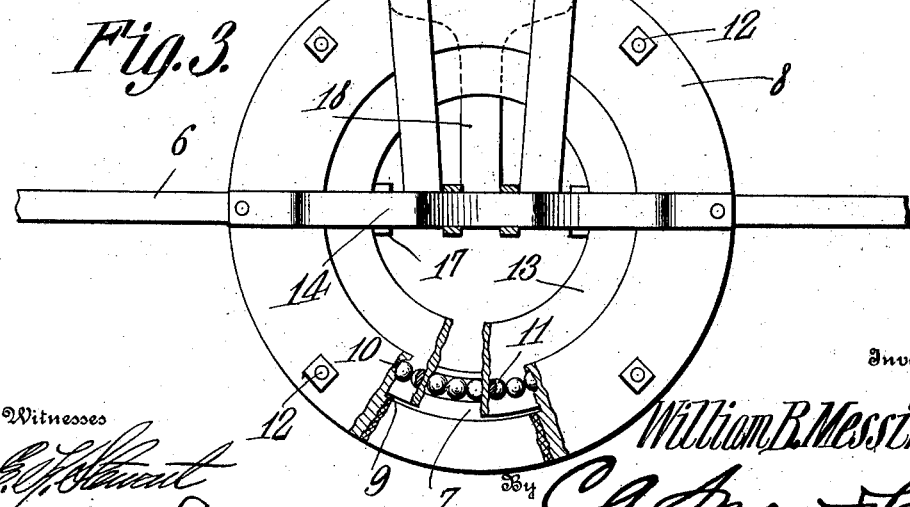
Witnesses
Inventor
William B. Messink
By C. A. Snow & Co.
Attorneys

UNITED STATES PATENT OFFICE.

WILLIAM B. MESSINK, OF WORTHVILLE, KENTUCKY.

FIFTH-WHEEL.

986,482. Specification of Letters Patent. Patented Mar. 14, 1911.

Application filed April 24, 1909. Serial No. 491,973.

*To all whom it may concern:*

Be it known that I, WILLIAM B. MESSINK, a citizen of the United States, residing at Worthville, in the county of Carroll and State of Kentucky, have invented a new and useful Fifth-Wheel Ball-Bearing, of which the following is a specification.

It is the object of the present invention to provide an improved construction of fifth wheel for vehicles and more specifically to provide a fifth wheel construction in which friction will be reduced to a minimum and in which a substantial connection may be had between the wheel sections and the vehicle spring and axle.

It is a further object of the invention to provide, in a fifth wheel construction, novel means for mounting the axle thereon whereby to insure against displacement or distortioning due to strains.

In the accompanying drawings, Figure 1 is a front elevation of a portion of a vehicle showing the application of the invention thereto. Fig. 2 is a vertical transverse sectional view through the fifth wheel and springs and axle of the vehicle, and Fig. 3 is a top plan view of the fifth wheel and the vehicle parts associated therewith.

In the drawings, the vehicle bolster springs are indicated by the numeral 5 and the front axle by the numeral 6, the fifth wheel embodying the present invention being designed to connect the axle 6 with the springs 5 for turning movement.

The fifth wheel embodied in the invention is comprised in part of two annular sections one of which is indicated by the numeral 7 and the other by the numeral 8, the section 7 being the lower section and the section 8 the upper section, and each of these two sections is formed in its inner peripheral edge with a rabbet 9 and in the opposing faces of the rabbets with ball or similar bearing races 10 in which are disposed bearing balls 11. As is clearly shown in the sectional view of the drawings, the annular sections 7 and 8 are secured together through the instrumentality of suitable bolts or other securing devices 12 and receive between them or rather between the bearing balls 11 which are carried thereby, the outer edge portion of an annulus 13 which constitutes the movable or swivel member of the fifth wheel, the sections 7 and 8 being relatively fixed.

As is clearly shown in Figs. 1 and 2 of the drawings, there is secured at its ends to the upper section 8 of the fifth wheel, an arched bar 14 which spans the said section 8 and intersects the axis of the said annular section 8 and to this bar 14 is secured the lower bow of the bolster spring 5 of the vehicle, there being hounds 15 secured at their forward ends to the under side of this bar 14 and intermediate of their ends to the upper face of the said section 8 at the rear thereof. These hounds 15 are the upper hounds and the arrangement and location of the lower hounds will be presently described.

Secured at its ends to the under side of the inner edge portion of the annulus 13 and spanning the same and intersecting its axis is a bar 16 to which is secured by means of suitable bolts 17, the axle 6, the axle being in this manner connected for turning movement with the bar 16 and consequently with the annulus 13. Secured upon the under side of the section 7 of the fifth wheel at the rear thereof and projecting forwardly with its forward end located directly beneath the axle 6 and at a point midway of the ends thereof is a hammer strap 18 through the said forward end of which and into the axle there is engaged a swivel bolt or pin 19, the axle being in this manner afforded not only an additional support but being also held firmly against yielding to torsional strains. The hammer strap is of considerably greater width at its rear end than at its forward end and whereby to afford an attaching portion for connection to the section 7 of the fifth wheel and integral with this attaching portion and projecting rearwardly therefrom are the lower hounds heretofore mentioned, these hounds being indicated by the numeral 20.

It is preferable, in assembling the sections 7 and 8 of the fifth wheel to interpose between the said sections a packing gasket 21 which may be of rubber, leather, or any other suitable material and which, owing to its yieldable properties, will normally tend to separate the said sections and will thereby lock the nuts upon the bolts 12 against unthreading from the bolts. It will be further understood in connection with the foregoing description of the invention and upon an inspection of the drawings that the gasket 21 effectually prevents entrance of dust and grit between the sections of the fifth wheel and that the annulus 13 is of such thickness as to substantially fill the space between the opposing faces of the rabbet 9 in the said sections 7 and 8 so that entrance of grit or sand into the ball bearing races is practically obviated.

By referring to the drawings it will be observed that the annulus 13 has its inner peripheral portion projecting continuously inwardly beyond the inner peripheries of the sections 7 and 8. The greatest pressure is exerted upon the annulus at points adjacent the ends of the bar 16. When the annulus becomes worn thin at these portions or points, the bolts or rivets securing the same to the bar may be removed and the annulus so rotated and again secured to the bar as to bring a practically unworn portion of the annulus into position adjacent the ends of the said bar 16. However, the annulus, in the device as placed upon the market, is not necessarily provided with bolt openings at right angles to the openings shown in Fig. 2 inasmuch as it is a simple matter for a blacksmith to drill openings through the annulus at any desired point for the purpose of securing it to the bar 16 in a position other than the position originally occupied. Thus, should one side of the annulus become more worn than an adjacent side, the annulus may be secured in a different position upon the bar 16 to present a new bearing surface, although this new position need not necessarily be at right angles to the original position.

What is claimed is:—

In a device of the class described, connected annular sections, a bar spanning one of said sections and adapted for connection with a vehicle, said sections being rabbeted at their inner peripheries and formed in opposing faces of their rabbets with bearing races, bearing balls disposed within the races, a flat annulus having its inner and outer peripheral edges concentric and disposed at its outer edge portion between the said annular sections and the bearing balls in the races thereof, the inner peripheral portion of the annulus projecting continuously inward beyond the inner peripheries of the said annular sections, and a bar spanning the annulus and secured at its ends to the said projecting portion of the annulus at diametrically opposite points and adapted for the attachment of a vehicle axle.

In testimony that I claim the foregoing as my own, I have hereto affixed my signature in the presence of two witnesses.

WILLIAM B. MESSINK.

Witnesses:
J. F. WALLACE,
FOREST BUTCHER.

---

Copies of this patent may be obtained for five cents each, by addressing the "Commissioner of Patents, Washington, D. C."